United States Patent [19]

Olson et al.

[11] Patent Number: 5,142,311
[45] Date of Patent: Aug. 25, 1992

[54] FILM ASSEMBLAGE WITH PRE-EXPOSED FILM AND METHOD FOR FORMING THE SAME

[75] Inventors: Carl L. Olson, Wayland; Harry R. Parsons, Reading, both of Mass.

[73] Assignee: Polaroid Corporation, Cambridge, Mass.

[21] Appl. No.: 726,761

[22] Filed: Jul. 8, 1991

[51] Int. Cl.5 .............................................. G03B 1/00
[52] U.S. Cl. ................................................... 354/120
[58] Field of Search ............................. 354/110, 120

[56] References Cited

U.S. PATENT DOCUMENTS

| | | | |
|---|---|---|---|
| 4,310,232 | 1/1982 | Reed | 354/125 |
| 4,427,279 | 1/1984 | Edelstein et al. | 354/107 |
| 4,655,570 | 4/1987 | Jaffe | 354/107 |
| 4,707,106 | 11/1987 | Johnson et al. | 354/481 |
| 4,816,848 | 3/1989 | Doyle, Jr. | 354/108 |
| 4,827,291 | 5/1989 | Guez | 354/125 |
| 4,896,176 | 1/1990 | Barrett | 354/122 |
| 4,994,832 | 2/1991 | Spector | 354/110 |

Primary Examiner—Michael L. Gellner
Attorney, Agent, or Firm—Alfred E. Corrigan

[57] ABSTRACT

During manufacture a film unit has one portion masked while it is exposed to light in a second portion to form a latent image of indicia on the mask. A pod of liquid developer is attached to the pre-exposed film unit and together they are mounted within a cassette. The cassete is inserted into a camera where the previously unexposed portion of the film unit is exposed to image bearing light while the pre-exposed portion of the film unit is masked from said light. The pod of developer liquid is passed through a pair of rollers to rupture the pod, spread the developer liquid between the layers of the film unit, and develop the two latent images as a single photograph.

22 Claims, 4 Drawing Sheets

FILM ASSEMBLAGE WITH PRE-EXPOSED FILM AND METHOD FOR FORMING THE SAME

FIELD OF THE INVENTION

This invention relates to apparatus and processes for pre-exposing portions of a film unit before it is positioned in a film cassette and inserted into a camera. The pre-exposed portions of the film unit are masked from subsequent image bearing light upon a second exposure when the unit is within the camera.

BACKGROUND OF THE INVENTION

Numerous techniques have been developed for getting two or more exposures of a single film unit, each exposure being directed to a particular portion of the film unit to thereby provide special indicia, background scenes and diverse subject matter. This basic concept is not new. Representative background photographic techniques in its field are discussed below.

A U.S. patent to Reed, U.S. Pat. No. 4,310,232, discloses making two exposures of the same film unit while it is in place within a camera. One of the exposures involves a background transparency overlying the film unit to provide the background desired. The other exposure involves an object before the camera.

A U.S. patent to Edelstein et al., U.S. Pat. No. 4,427,279, discloses camera structure to provide two exposures of a single film unit. The two exposures are to different sections of the film unit. One exposure is through a lens and shutter system and the other is by way of an internally structured light source directing light to the film unit through a slide which provides indicia or other instructional information on a portion of the exposed film unit. Both exposures take place simultaneously inside the same camera.

A U.S. patent to Jaffe, U.S. Pat. No. 4,655,570, is similar to the patent to Edelstein et al. mentioned above in that it divides each film unit into two sections. Each patent provides an internally mounted light source to expose one section of each film unit and a lens and shutter system to expose the other section of the film unit.

A U.S. patent to Johnson et al., U.S. Pat. No. 4,707,106, discloses a lens masking technique to obtain multiple images on a single film unit but all exposures occur after the film cassette is mounted in the camera.

A U.S. patent to Doyle, U.S. Pat. No. 4,816,848, discloses mounting an image bearing template in the focal plane opening of a film cassette to provide indicia on film units when they are exposed.

A U.S. patent to Guez, U.S. Pat. No. 4,827,291, discloses masking and exposing each frame of a roll of negative film while it is in a camera, rewinding the exposed roll, providing a different mask and exposing each frame a second time. All masking and exposures take place while the roll of film is in the camera.

A U.S. patent to Barrett, U.S. Pat. No. 4,896,176, discloses placing a transparency within a cassette overlying a film unit. Each film unit receives reflected light from a flash unit, which light reflects from the back side of an external screen through the camera lens. The reflected light exposes the film unit around its edges and thereby produces an edge design as desired by the photographer. The edge design is supplied by an overlay inside the camera between the lens and the film unit. The central portion of the film unit is simultaneously exposed to record the subject before the camera. Exposure of the film unit occurs only once when the photographer activates the shutter.

A U.S. patent to Spector, U.S. Pat. No. 4,994,832, includes a disclosure of pre-exposing a film unit at some period of time prior to the time the film unit is exposed a second time to capture the image of the desired subject. The technique used by Spector is not one of using a mask over a portion of the film unit, but rather exposing the whole film unit frame twice, first by an underexposure based on light and timing and later by a full exposure of the primary object to be photographed.

What is not disclosed by the background information as set out above are appropriate apparatus and procedural steps for pre-exposing a series of film units with the same background or peripheral indicia on each unit during the manufacturing process 1) prior to the time the individual film units are severed from the strip or web of film and 2) before a pod of developer liquid is attached to the individual film unit for use in a conventional self developing film combination.

SUMMARY OF THE INVENTION

During the manufacturing process a strip of self developing film units is produced in conventional fashion. In this invention each frame of the strip is masked and exposed to image bearing light. The mask prevents exposure of one portion of the film unit while a different portion of the film unit is exposed to a first image bearing light.

The image may be any desired image including a Christmas greeting, something in relation to an athletic event, advertising indicia, a vignette, and the like. The location and configuration of the portion of the film unit exposed to the first image bearing light is an option available to the manufacturer of the film unit because each of the film units in the ultimately supplied cassette of film units has the pre-exposed latent image at the same location on each film unit.

After exposure of each frame to the same image, the film units are severed from the strip, a pod of developer liquid is attached thereto and the film unit is mounted in a conventional film cassette suitable for loading in a conventional camera suitable for film of the instant or self-developing type.

What is not conventional, in a preferred embodiment of the invention, is the shape of the focal plane or exposure opening in the film cassette. The exposure opening is bordered by opaque material. Said border serves to mask the pre-exposed areas of the film unit such that a second exposure of a pre-exposed film unit to image bearing light while within the camera impinges on the film unit only on the area not previously exposed.

The means for effecting the exposure of only the non-exposed area of the film unit may be accomplished in three separate ways. By far the simplest way is to form the cassette with its exposure opening exactly in the shape desired. A second way is to provide a sheet of transparent plastic having an opaque area which is adapted to be located in superposed relation to the pre-exposed area of the film unit. This sheet would be fitted into place over, or located within, the normal rectangular exposure opening in a conventional cassette and lying on the outside of the cassette. A third way is to have a similarly shaped sheet of plastic which fits inside the conventional film cassette between the conventional dark slide and the conventional rectangular exposure opening.

Whether the cassette exposure opening described above is formed during manufacture or whether a rectangularly shaped opening is modified by the manufacturer by the application of a sheet of partially opaque plastic or other material, the result is the same. The pre-exposed areas of the underlying film unit are masked or screened from the second exposure and subsequently both latent images are developed in conventional fashion when the twice exposed film unit is ejected from the cassette and the pod of developer liquid passes within the bite of a pair of rollers which rupture the pod, spread the developer liquid between layers of the film unit, and develop a composite picture with both the desired pre-exposed indicia and the image captured by the photographer during the picture taking process with the camera.

Objects of the invention and the scope of applicability of the present invention will become apparent from the detailed description to follow taken in conjunction with the accompanying drawings in which like parts are designated by like reference characters.

BRIEF DESCRIPTION OF THE DRAWINGS

For a fuller understanding of the nature and objects of the invention, reference should be had to the following detailed description taken in connection with the accompanying drawings wherein.

Figure 1:
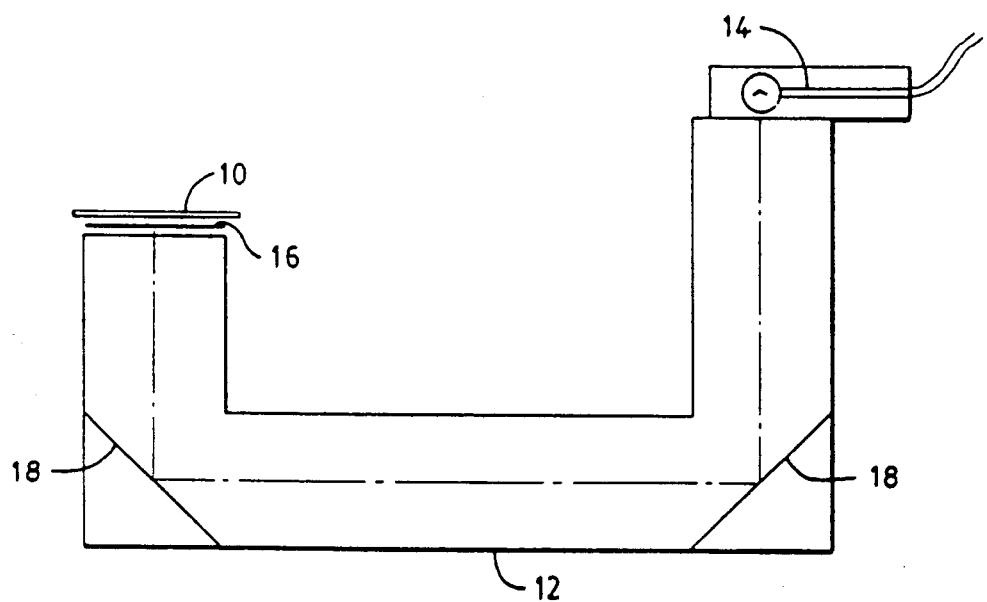
FIG. 1 is a diagrammatic illustration of apparatus for pre-exposing a portion of each frame of a strip of film units to an image during manufacture.

In describing the preferred and alternative embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected" or terms similar thereto are often used. They are not limited to direct connection but include connection through other elements where such connection is recognized as being equivalent by those skilled in the art.

DETAILED DESCRIPTION OF THE PREFERRED EMBODIMENT

The product to be produced according to this invention in its preferred embodiment is a photograph produced by the instant or self-developing type film unit and camera. Around the border of the photograph is a particular design or pattern. The main body of the ultimate photograph is selected on site by the photographer as exposures are made in conventional fashion. The pre-selected design around the periphery of each photograph results from pre-exposing that area of each film unit at the manufacturer prior to the time the film units are assembled into the film cassette and the cassette placed in the camera.

The preferred embodiment includes designs around the periphery of the photograph, however, the manufacturer of the film units may select any particular design or physical placement on the film unit which is desirable at the time. It may be that the pre-exposed area of each of the film units in the cassette will be pre-exposed along one rectangular edge, two of the edges, or all four; it all depends on how the product is manufactured in the first place.

FIG. 1 diagrammatically illustrates one step of the manufacturing process wherein a strip of instant film 10 manufactured in conventional fashion has a portion of its photosensitive layer pre-exposed to image bearing light during the manufacturing process before the individual frames of the film are severed into individual units and before being combined with other elements such as the conventional pod of liquid developer, liquid trap, etc. The film 10 passes over one end of a light tunnel 12 having a strobe light 14 at one end and an image bearing template 16 at the other end. The tunnel may contain one or more mirrors 18 to reflect light from the strobe 14 through the template 16 to provide a latent image on a portion of the strip of film 10.

The template 16 includes an opaque section (not shown) which serves to mask a first portion of the film strip 10 from exposure to light 14 while allowing a second portion to receive the image from the template 16. The image received by the film strip 10 from the passage of light rays actinic to photosensitive emulsions on the unmasked portion of the film unit is the image imprinted on the template 16.

A plurality of frames of the film strip 10 are sequentially exposed to the image which will remain latent because it will not be subjected to processing liquid until much later, as will be explained subsequently.

Figure 2:
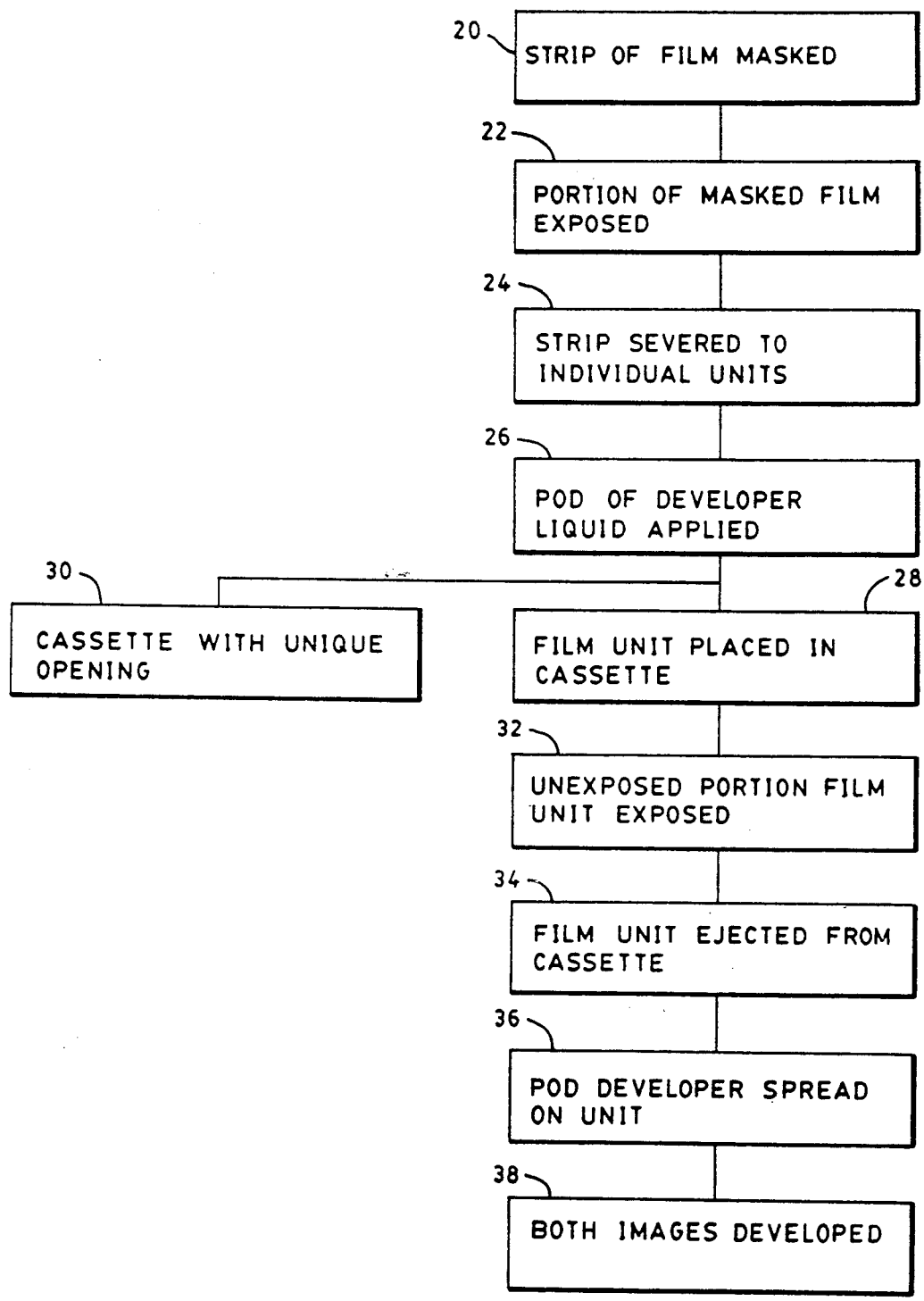
FIG. 2 is a block diagram illustrating the procedural sequence of producing the desired photograph according to this invention.

FIG. 2 illustrates a procedural sequence for producing the desired photograph according to this invention and it begins at 20 which is the point in the manufacturing process illustrated in FIG. 1 where the strip of film 10 is masked by the template 16. The second step 22 involves the exposure of the unmasked portion of the film to the light from the strobe 14 which passes through the unmasked portion of the template 16. Next the strip is severed 24 to provide individual film units, each bearing a latent image from the design on template 16. A rupturable pod of processing liquid and other elements are combined with each individual film unit at 26 in conventional fashion and a suitable number are mounted at block 28 in a cassette also in conventional fashion. What is not conventional is the shape of the focal plane opening or exposure aperture in the cassette.

During the manufacturing process and prior to the time the film units are placed in the cassette, which may be formed from any suitable opaque material, the cassette is preferably supplied at 30 having a unique exposure opening. The opaque material defining the shape of the exposure opening is adapted to cover the pre-exposed areas of the underlying film units bearing the latent image such that light subsequently impinging on each individual film unit will do so at a location which has not been previously exposed. The cassette with the unique exposure opening is preferably an integral plastic opaque box generally rectangular in form which will be described in more detail subsequently. Alternatively, the shape of the focal plane opening may be rectangular and similar results achieved by a partially opaque sheet of plastic mounted on the inside or outside of the cassette. The manner for mounting the plastic insert or template will also be discussed subsequently.

After the film units are placed in the film cassette, it may be labeled appropriately to indicate the pattern of the pre-exposed latent image borne by each of the film units. The cassette, containing a plurality of film units, a dark slide and a platen for resiliently supporting a stack of the film units, is subsequently mounted in a conventional instant camera, the dark slide is automatically ejected from the cassette, and the unexposed portion of the film unit is exposed 32.

In instant or self-developing cameras, after a film unit is exposed by the actuation of the shutter, the film unit is ejected form the cassette at block 34. Automatic, battery powered operation of the camera ejects the film unit from the cassette into the bite of a pair of rollers which squeeze and rupture the pod of developer liquid and spread the same between the layers of the film unit 36. This results in the development of both latent images as depicted at block 38 as the film unit is ejected from the camera or stored within the camera while the developing process continues.

Figure 3:
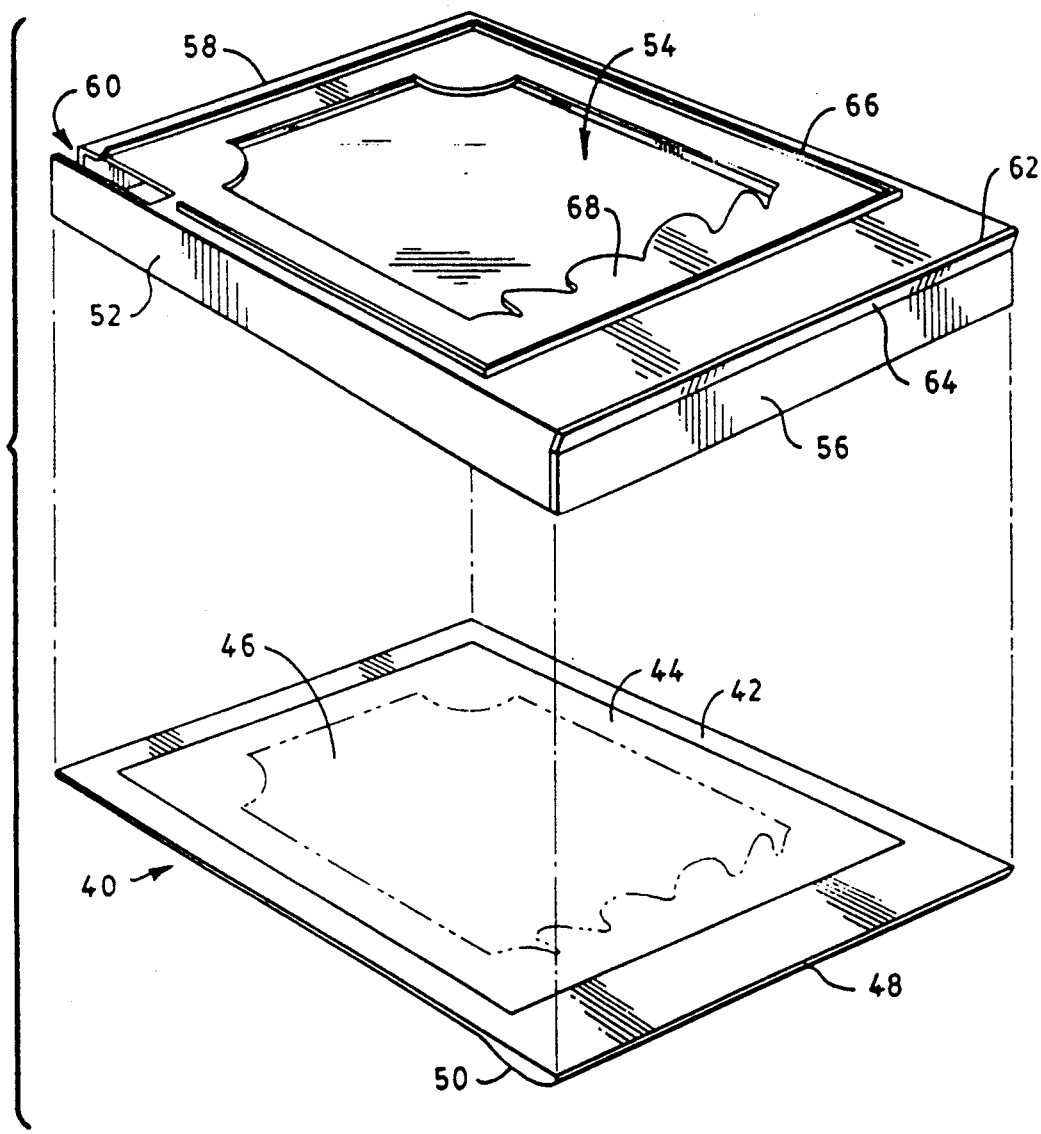
FIG. 3 is an exploded view of a film assemblage comprising a film cassette and one film unit according to this invention.

FIG. 3 is an exploded view of a film cassette 52 according to this invention and a film unit 40 (only one being shown for reasons of clarity) to be used with the cassette. The film unit 40 has a generally rectangular opaque (white) border 42 which defines the rectangular periphery of the photograph to be produced. The rectangular border 42 circumscribes an edge area 44 defined by the broken line which has been pre-exposed in step 22 of the manufacturing process before the film unit is mounted in the cassette. A centrally located, non-exposed area 46 of the film unit is intended to receive a second image bearing light to produce an image perceived by the photographer in a camera's viewfinder at the time the film unit is exposed within the camera.

A forward end 48 of the film unit 40 has mounted thereon a pod 50 of processing liquid which will be ruptured by a pair of rollers (not shown) after the unexposed portion 46 of the film unit has been exposed by light from the subject being photographed by the photographer.

The cassette 52, in which a plurality of film units 40 are stacked, is similar to that shown in the '848 patent except for the shape of an exposure opening 54. The cassette itself includes a leading end wall 56 and a trailing end wall 58. The trailing end wall includes a slot 60 to allow a pick to advance an exposed film unit out of the cassette. Film units exit the cassette through a film exit slot 62 in the leading end wall 56. Slot 62 is light sealed by a hinged door 64 before the cassette is inserted in the camera. The purpose of having the slot 62 sealed is to keep the interior of the cassette in lighttight condition prior to the time the cassette is mounted in operable position in the camera. An opaque sheet of material or dark slide (not shown) is located on top of the uppermost film unit in the stack of film units and below the exposure opening 54 at the time the cassette is inserted into the camera. A platen (not shown) is located between the cassette's rear or bottom wall and the other end of the stack for resiliently biasing the film units toward the exposure aperture. The internal camera structure partially opens the door 64 and the opaque sheet or dark slide is ejected thus uncovering the underlying film unit 40 in preparation for its subsequent exposure to image bearing light passing through the camera's lens when its shutter is actuated.

An upstanding rib 66 on the forward wall of a cassette 52 defines the general rectangular shape of a conventional exposure opening, but in this preferred embodiment the forward wall is modified to provide an integral mask 68 having a configuration corresponding to the underlying pre-exposed area 44 on the film unit 40. Thereby, when the film unit 40 is exposed to a second image bearing light, it impinges only on the area 46 of the film, which was not previously exposed during the manufacturing process.

It should be noted that the interior surfaces of the four side walls of the film cassette 52, including the walls 56 and 58, bound an area substantially equal to that of a film unit. Thus their relationship functions to guide or locate the uppermost film unit in the stack such that its photosensitive area, as defined by the border 42, always assumes the same relationship with the exposure aperture 54 thus insuring proper registration between the non-exposed portion 46 of the film unit and the aperture 54.

Figure 4:
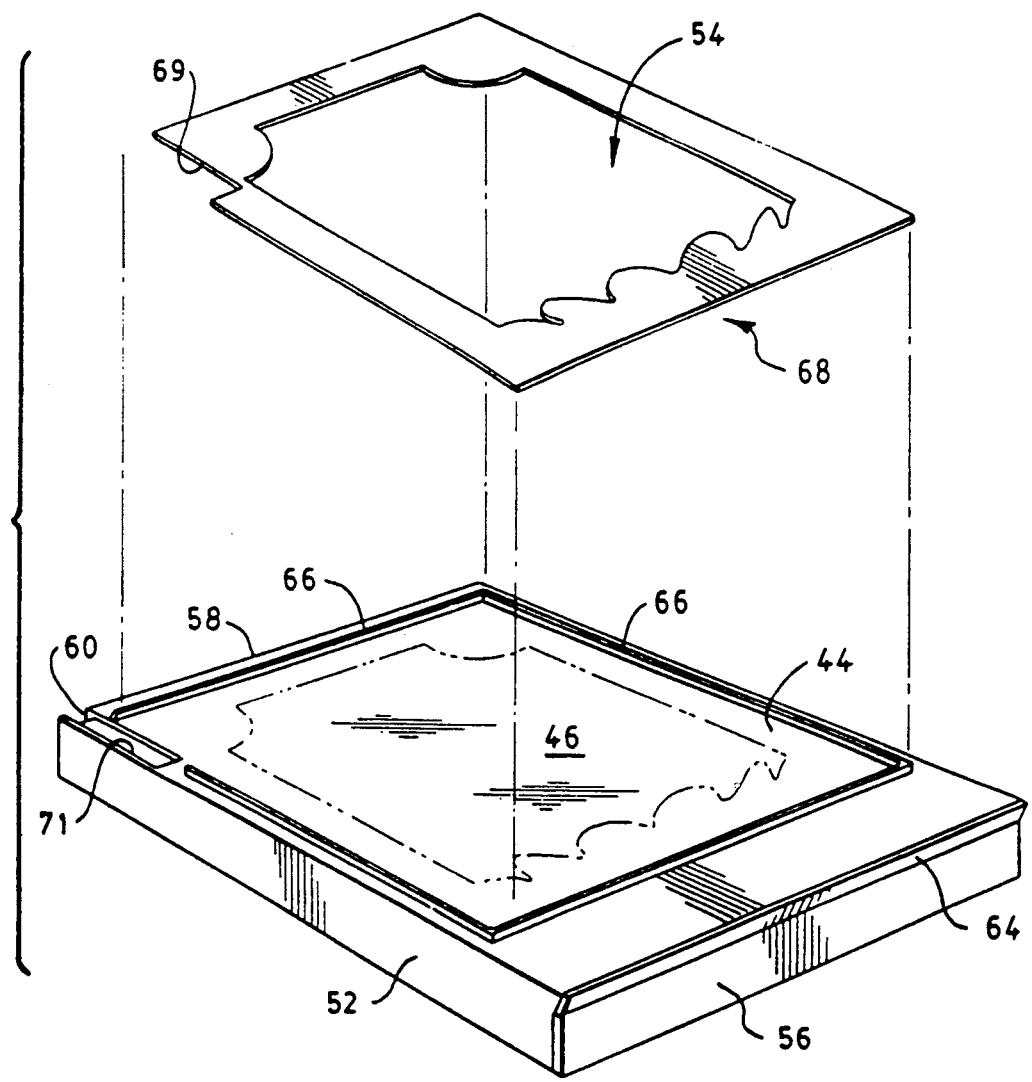
FIG. 4 is an exploded view of an alternative embodiment for the cassette and film unit of FIG. 3.

FIG. 4 illustrates an alternative embodiment of the invention. In this alternative embodiment, the opaque mask 68 is not formed integral with the cassette 54. Rather it is a second part used to form the desirable exposure opening 54. In this embodiment, the mask 68 fits on the exterior of the cassette 52 by fitting inside the ribs 66. Thereby, the mask 68 covers the pre-exposed areas 44 of the underlying film unit which has its photosensitive area located in alignment with the normal rectangular exposure opening. The mask 68 also includes a cut away section 69 which is adapted to overlie a similar shaped slot 71 in the cassette's 52 forward wall so as to enable the camera's film advancing mechanism to enter the cassette 52 via the opening 60 and move the film unit 40 partially out of the cassette without interference form the mask 68.

There are various ways of holding the mask 68 within the rectangular shape formed by the ribs 66 but no particular structure is preferred. For example, the mask may be attached to the rib 66, or the mask 68 may be dimensioned so that two or more of its four edges may be folded upwardly so as to be located in engagement with adjacent vertical surfaces of the rib 66. Any such structure which satisfies the mechanical properties of the cassette and mask are suitable.

A third embodiment allows the opaque mask or template 68 to be mounted inside the cassette as a separate unit rather than on the exterior surface. This mask of the third embodiment fits between the dark slide and the forward wall of the cassette and preferably has a length and width substantially equal to the underlying film units. Any suitable means may be provided for keeping the mask 68 in place during the removal of a film unit from the cassette 52. Such is not illustrated except in the exploded view of FIG. 4 which may be considered as a showing of the second and third embodiments.

In operation, a cassette 52 containing a plurality of pre-exposed film units 40 is supplied to a photographer. The film units are manufactured and pre-exposed according to the sequence of procedural steps illustrated in FIG. 2. The cassette may be suitably identified by packaging or other indicia to advise its user of the configuration of the pre-exposed area.

The cassette is mounted in a camera and, after ejection of the dark slide, film units are exposed in conventional fashion. The conventional exposure in the camera exposes only those areas not previously exposed during the manufacturing process and not masked by the border of the exposure opening.

Ejection of exposed film units from the cassette and simultaneous development of both latent images occurs automatically. Thereby, photographs are produced with various selected subjects but with each photograph bearing the preselected indicia from the manufacturing process.

While certain preferred embodiments of the present invention have been disclosed in detail, it is to be understood that various modifications may be adopted without department from the spirit of the invention or scope of the following claims.

What is claimed:

1. A process for producing a photograph comprised of a composite of two separately distinct images taken at different points in time comprising:
    providing a film unit having a surface through which an underlying photosensitive layer may be exposed;
    positioning a template adjacent to the film unit, the template having first and second sections with the first section being formed to permit the passage therethrough of actinic light and containing an image which is to be subsequently reproduced in the film unit and the second section being substantially opaque;
    directing actinic light through the first section of the template and onto the photosensitive layer so as to pre-expose a first portion thereof to form a first latent image while simultaneously leaving a second portion thereof unexposed;
    packaging the film unit in an opaque film cassette having an exposure aperture in one wall thereof, the exposure aperture having a configuration substantially identical in shape and size to that of the second portion of the photosensitive layer while the first portion of the photosensitive layer containing the first latent image is substantially completely covered by portions of the wall defining the exposure aperture;
    locating the film cassette in a camera with the film unit supported in position for exposure;
    actuating a shutter of the camera to expose the film unit to actinic light emanating from a scene, such scene light being adapted to expose only the second portion of the photosensitive layer of the film unit to provide a second latent image while the first portion of the photosensitive layer of the film unit containing the first latent image is protected from further exposure by the wall of the film cassette; and
    processing the film unit so as to simultaneously develop the first and second latent images.

2. The process of claim 1 wherein the film unit is of the instant or self-developing type and the step of processing the film unit includes spreading a processing liquid between layers of the film unit to initiate the formation of visible images therein.

3. The process of claim 2 wherein the first latent image is representative of an event.

4. The process of claim 2 wherein the first latent image is a vignette.

5. The process of claim 3 including the step of packaging a plurality of the film units in the film cassette.

6. The process of claim 5 wherein each of the first latent images are identical.

7. The process of claim 4 including the step of packaging a plurality of the film units in the film cassette.

8. The process of claim 7 wherein each of the first latent images are identical.

9. A process for producing a photograph comprised of a composite of two separately distinct images taken at different points in time comprising:
    providing a film unit having a surface through which an underlying photosensitive layer may be exposed;
    positioning a first template adjacent tc the film unit, the first template having first and second sections with the first section being formed to permit the passage therethrough of actinic light;
    directing actinic light toward the template and through the first section and then onto the photosensitive layer of the film unit so as to provide a first latent image in the photosensitive layer;
    packaging the film unit in an opaque film cassette having an exposure aperture in one wall thereof;
    aligning a second template with the exposure aperture in the film cassette and in overlying relation to the film unit, the second template having a first opaque section dimensioned to substantially cover the first latent image and a second transparent section;
    locating the film cassette in a camera with the film unit and overlying template supported in position for exposure of the film unit;
    actuating a shutter of the camera to expose the film unit to actinic light emanating from a scene, such scene light being adapted to expose the photosensitive layer of the film unit only in the area in alignment with the second transparent section of the second template thus providing a second distinct latent image while the remaining area of the photosensitive layer of the film unit containing the first latent image, is protected from further exposure by the first opaque section of the second template; and
    processing the film unit so as to simultaneously develop the first and second latent images.

10. The process of claim 9 wherein the film unit is of the instant or self-developing type and the step of processing the film unit includes spreading a processing liquid between layers of the film unit to initiate the formation of visible images therein.

11. The process of claim 10 wherein the first latent image is representative of an event.

12. The process of claim 10 wherein the first latent image is a vignette.

13. The process of claim 11 including the step of packaging a plurality of the film units in the film cassette.

14. The process of claim 13 wherein each of the first latent images are identical.

15. The process of claim 12 including the step of packaging a plurality of the film units in the film cassette.

16. The process of claim 15 wherein each of the first latent images are identical.

17. The process of claim 10 further including the step of packaging the second template within the film cassette at a location between the film unit and the wall of the film cassette having the exposure aperture therein.

18. A photographic film assemblage comprising;
    a self-developing film unit having a first section which has been pre-exposed during manufacture and a second distinct, non-exposed section; and
    an opaque film cassette for receiving said film unit, said film cassette including a wall having an exposure aperture therein which is adapted to be located in alignment with said second section of said film unit and whose configuration is substantially identical to the configuration of said second section of said film unit whereby during exposure of said film unit within a camera, only said second section will be exposed to light emanating from a scene being photographed.

19. A photographic film assemblage comprising:
a plurality of self-developing film units, each of said film units including a first section which has been pre-exposed during manufacture and a second non-exposed section; and
an opaque film cassette for receiving a stack of said film units, said film cassette including a wall having an exposure aperture therein through which an endmost film unit in said stack may be exposed; and
means for modifying the shape of said exposure aperture so as to allow image-bearing light from a scene being photographed to expose said second non-exposed section of said film unit while simultaneously preventing further exposure of said first pre-exposed section.

20. A photographic film assemblage as defined in claim 19 wherein said modifying means is located between said endmost film unit in said stack and an interior surface of said wall of said film cassette.

21. A photographic film assemblage as defined in claim 19 wherein said modifying means is fixedly secured to an external surface of said wall of said film cassette.

22. A photographic film assemblage as defined in claim 19 wherein said modifying means is an integral part of said wall of said film cassette.

* * * * *